Patented Oct. 27, 1936

2,058,433

UNITED STATES PATENT OFFICE 2,058,433

DYEING OF ACETATE ARTIFICIAL SILK

Friedrich Felix, Basel, Max Bommer, Riehen, near Basel, and Wilhelm Huber, Basel, Switzerland, assignors to Society of Chemical Industry in Basle, Basel, Switzerland No Drawing. Application October 11, 1933, Serial No. 693,219. In Switzerland October 15, 1932

2 Claims. (Cl. 8—5)

It is known that acetate artificial silk can be dyed by means of feebly basic, sparingly soluble or insoluble dyestuffs. While a large number of such dyestuffs dye acetate artificial silk only feeble or matt tints, the number of dyestuffs capable of dyeing such silk in deep full tints is comparatively small. The number cannot be increased directly by introducing substituents into the molecule of the dyestuff, since very frequently the enlargement of the molecule is associated with a strong diminution of the affinity of the dyestuff for acetate artificial silk.

The present invention relates to a composition of matter and to a process for dyeing acetate artificial silk in which the dyeing is conducted with a composition of matter consisting of a mixture of a feebly dyeing dyestuff with a similarly constituted dyestuff. The term "similarly" comprises the homologous, analogous and isomeric dyestuffs having a somewhat similar shade. Such a composition of matter presents an increased affinity for the fiber which is quite considerable and makes it possible to use products which hitherto have had no practical value. The dyestuff of low affinity becomes more readily adsorbed when it is mixed with a dyestuff which in itself has a practically sufficient affinity for acetate artificial silk. In this manner the affinity of the already useful acetate artificial silk dyestuff may be improved. Furthermore, it is possible by use of such a composition of matter to shift the colour tint of the dyeing in a desired manner in one or the other direction without introduction of substituents into the dyestuff molecule of the dyestuff of good affinity, which introduction, as already stated, may affect the degree of affinity of the dyestuff in an unfavourable manner.

The compositions of matter of the present invention may be made by adding to the components of a dyestuff during its manufacture a homologue, isomeride or analogue thereof, or by dissolving the finished dyestuffs in a common solvent and precipitating them together in a finely divided state, or by finely grinding together the finished dyestuffs, or by adding the previously finely subdivided dyestuffs to the same dye-bath.

The process is applicable to all classes of dyestuffs usual in the acetate artificial silk dye-house. It finds a special application in the case of dyestuff preparations from amino-azo-dyestuffs. When the preparation is to be made from an amino-azo-dyestuff there may be added to the coupling component or to the diazo-component or to both, a homologue, isomeride or analogue thereof, and the mixture of dyestuffs may thus be made directly, or the finished amino-azo-dyestuffs may be mixed with each other by fine grinding or may be added to the same dye-bath.

The following examples illustrate the invention, the parts being by weight:—

Example 1

172.5 parts of 4-nitro-2-chloraniline are diazotized in the usual manner and the diazo-solution thus obtained is added to a solution of 119.5 parts of diethylaniline and 24.2 parts of dimethylaniline in the necessary quantity of dilute hydrochloric acid. After neutralization with sodium acetate and stirring until the coupling is at an end the precipitated mixture of dyestuffs is filtered and washed. After this mixture of dyestuffs has been brought to a fine state of subdivision in suitable manner by addition of a dispersing agent, it dyes acetate artificial silk very intense bordeaux red tints which are considerably stronger than the dyeings obtainable with the same proportion of either individual dyestuff. Instead of 4-nitro-2-chloraniline, 5-nitro-anisidine may be used, or a mixture of these two bases may be used. Also other homologues or substitution derivatives of aniline. These dyestuffs may be brought into the form of solid preparations in known manner by addition of a further quantity of dispersing agent, such as sulfite cellulose lye, and evaporation at a temperature which is not too high. The dyestuff preparation may also be made by mixing together the individual dyestuffs.

Example 2

A diazo-solution made from 138 parts of paranitraniline is mixed with a hydrochloric acid solution of a mixture of 75 parts of dimethylaniline and 60 parts of diethylaniline. The coupling is completed by the addition of sodium acetate. The precipitated dyestuff is filtered and washed. It is converted by grinding with a dispersing agent into a form suitable for dyeing acetate artificial silk. The preparation thus made dyes acetate artificial silk intensely orange, whereas the dyestuff from diazotized paranitraniline and dimethylaniline and that from para-nitraniline and diethylaniline yields on this material a matt dyeing. Similar results are obtained with mixtures of the dyestuffs from diazotized para-nitraniline and diazotized nitrotoluidine ($NO_2$:$CH_3$:$NH_2$=4:2:1) and dimethylaniline or diethylaniline, or with mixtures of 3 or 4 or more dyestuffs of this example.

Example 3

5 parts of a paste of 20 per cent. strength of the dyestuff made as described in Example 1 are stirred with about the same weight of a soap solution of 6 per cent. strength at about 50° C. and the whole is diluted with likewarm water to 300 parts. 10 parts of acetate artificial silk are now entered, the temperature of the bath is raised within ¾ hour to 75–80° C. and the goods are handled for about ¾ hour at this temperature. Rinsing and drying follow. The acetate artificial silk is dyed intensely Bordeaux red.

What we claim is:—

1. A dyeing composition consisting of a mixture of at least two acetate artificial silk amino azo dyestuffs, of which at least one has a poor affinity for acetate artificial silk, selected from the products which correspond to the general formula

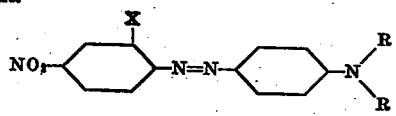

in which $x$ is a member of the group consisting of hydrogen, chlorine, methyl and methoxy, and both R's are the same members of the group consisting of methyl and ethyl.

2. A process of dyeing acetate artificial silk wherein the operation is conducted with a composition of matter consisting of a mixture of at least two acetate artificial silk amino azo dyestuffs, of which at least one has a poor affinity for acetate artificial silk, selected from the products which correspond to the general formula

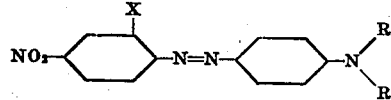

in which $x$ is a member of the group consisting of hydrogen, chlorine, methyl and methoxy, and both R's are the same members of the group consisting of methyl and ethyl.

FRIEDRICH FELIX.
MAX BOMMER.
WILHELM HUBER.